United States Patent
Lewis et al.

(10) Patent No.: US 6,817,262 B2
(45) Date of Patent: Nov. 16, 2004

(54) INTERLOCK DEVICE WITH STAMPED LEAD FRAME

(75) Inventors: John T. Lewis, Grand Haven, MI (US); Donald R. Rempinski, Grand Haven, MI (US)

(73) Assignee: Grand Haven Stamped Products, division of JSJ Corporation, Grand Haven, MI (US)

(*) Notice: Subject to any disclaimer, the term of this patent is extended or adjusted under 35 U.S.C. 154(b) by 172 days.

(21) Appl. No.: 10/287,396

(22) Filed: Nov. 4, 2002

(65) Prior Publication Data

US 2004/0083843 A1 May 6, 2004

(51) Int. Cl.[7] .................. B60K 17/04; B60K 17/12
(52) U.S. Cl. .............. 74/473.12; 200/61.88; 192/220.4; 477/96
(58) Field of Search ............ 74/473.12; 192/220.4; 192/220.5; 200/61.88; 477/96, 99

(56) References Cited

U.S. PATENT DOCUMENTS

| 3,945,808 | A | | 3/1976 | Sheesley et al. | |
|---|---|---|---|---|---|
| 4,880,092 | A | | 11/1989 | Kito et al. | |
| 4,947,968 | A | | 8/1990 | Slavin et al. | |
| 5,076,114 | A | | 12/1991 | Moody | |
| 5,176,231 | A | | 1/1993 | Moody et al. | |
| 5,186,069 | A | * | 2/1993 | Asano et al. | 74/473.23 |
| 5,402,870 | A | | 4/1995 | Osborn | |
| 5,489,246 | A | | 2/1996 | Moody et al. | |
| 5,494,141 | A | | 2/1996 | Osborn et al. | |
| 5,593,011 | A | * | 1/1997 | Harada | 192/220.4 |
| 5,647,818 | A | | 7/1997 | Moody | |
| 5,673,013 | A | | 9/1997 | Moody et al. | |
| 5,677,658 | A | | 10/1997 | Osborn et al. | |
| 5,718,312 | A | | 2/1998 | Osborn et al. | |
| 5,729,187 | A | | 3/1998 | Moody et al. | |
| 5,757,132 | A | | 5/1998 | Matsuno et al. | |
| 5,902,209 | A | | 5/1999 | Moody | |
| 5,938,562 | A | | 8/1999 | Withey | |
| 5,993,353 | A | | 11/1999 | Chung | |
| 6,082,213 | A | * | 7/2000 | Skogward | 74/473.18 |
| 6,142,282 | A | | 11/2000 | Rudisil et al. | |
| 6,148,686 | A | * | 11/2000 | Kataumi | 74/473.18 |
| 6,393,932 | B1 | * | 5/2002 | Seki et al. | 74/473.12 |
| 6,530,293 | B1 | * | 3/2003 | Rückert et al. | 74/473.12 |
| 6,622,629 | B2 | * | 9/2003 | Hodge et al. | 102/235 |
| 2002/0029951 | A1 | * | 3/2002 | Beattie et al. | 192/220.4 |
| 2003/0213327 | A1 | * | 11/2003 | Syamoto | 74/473.12 |

* cited by examiner

Primary Examiner—David Fenstermacher
(74) Attorney, Agent, or Firm—Price, Heneveld, Cooper, DeWitt & Litton

(57) ABSTRACT

An interlock device includes a housing and a toggle interlock mechanism with an extendable interlock pin. The interlock device also includes a preassembled switch, an electromechanical device, and a lead frame interconnecting the switch and electromechanical device. The lead frame conductors are formed as one piece, but are separated after assembly into the housing. The conductors and mating components include mating non-releasable contacts that telescope together in a manner that forms a robust assembly and that facilitates automation of the assembly process. A method related to the above is also disclosed.

18 Claims, 5 Drawing Sheets

INTERLOCK DEVICE WITH STAMPED LEAD FRAME

BACKGROUND OF THE INVENTION

The present invention relates to a shift interlock device, and more particularly to a brake-transmission-shift-ignition (BTSI) interlock device and circuit integrated into a shifter.

Brake-transmission-shift-ignition (BTSI) interlock devices and circuits are known in the art, and further it is known to incorporate a toggle mechanism and preassembled switch into such devices. For example, see U.S. Pat. No. 5,759,132 to Osborn, issued Jun. 2, 1998. A known existing BTSI shifter similar to U.S. Pat. No. 5,759,132 is described in the discussion below entitled "Prior Art". (See FIGS. 1–2 of the present disclosure.) This known existing BTSI shifter includes a preassembled micro switch that is soldered onto a circuit board. The subassembly is then operably positioned in and secured to the handle of a shift lever assembly of a vehicle shifter. However, this shift lever assembly is undesirably expensive, partially because of the cost of the circuit board, but also because of secondary process costs (e.g. soldering, manual placement and attachment within the handle, and electrical connections). Also, circuit boards have quality and warranty concerns because they are not well suited for the vibrations and harsh environments commonly associated with vehicle shifters (e.g. temperature and humidity variations in the passenger compartment associated with day and night, and/or temperature extremes associated with winter and summer, and/or vibrations and with shifting the shift lever and/or associated with traveling at high speeds along a bumpy road and/or when an engine idles). Accordingly, further improvement is desired in this assembly, including reducing component costs and increasing the automation and efficiency of assembly, and improving the durability and robustness of the shift lever assembly.

It is also known to use a lead frame in a brake shifter interlock having a toggle mechanism. For example, see Withey U.S. Pat. No. 5,938,562, which discloses a lead frame incorporated into a toggle interlock device. In the Withey arrangement, the lead frame incorporates conductive components forming a switch. But this switch arrangement can have quality problems, since the conductive components are subject to distortions and dimensional variations, wear, and other problems that occur during installation and use and during the wide temperature variations commonly experienced by shifters. This can lead to poor and unreliable operation of the integral switch. It is desirable to incorporate a preassembled switch into a circuit using a lead frame. However, problems still remain in terms of assembly and warranty problems associated with soldering and/or other electrical connections. Also, the problems associated with dimensional inconsistencies and part-handling common in lead frames need to be addressed, as well as the overall ability to automatically assemble the components.

Accordingly, a shifter is desired solving the aforementioned problems and having the aforementioned advantages.

SUMMARY OF THE INVENTION

The present invention includes a shifter for a vehicle having an electrical control circuit. The shifter includes a base, a shift lever pivoted to the base, and an interlock device on one of the base or the shifter that engages an abutment surface on the other. The abutment surface is configured to be selectively engaged by the interlock device to control movement of the shift lever. The interlock device includes a preassembled switch, an electromechanical device, and a lead frame having at least four conductors. The electromechanical device has an interlock member movable to an extended position for engaging the abutment surface and movable to a retracted position for operating the switch and allowing the shift lever to move. The four conductors operably interconnect the switch and the electromechanical device and define a three-prong terminal adapted for electrical connection to the vehicle control circuit for operating the electromechanical device and for signaling to the vehicle control circuit that the interlock member has been operated.

In another aspect of the present invention, a preassembled interlock device includes a housing and a toggle interlock mechanism including an extendable pin operably positioned in the housing. The pin is extendable to a position outside the housing for engaging an abutment surface. A preassembled switch, an electromechanical device, and a lead frame are attached to the housing in an arrangement where the electromechanical device operates the switch when the extendable pin is retracted. The lead frame includes at least four conductors operably interconnected to the switch, the electromechanical device, and to a terminal adapted for electrical connection to a control circuit for operating the electrical mechanical device, and for signaling to the vehicle control circuit that the extendable pin has been moved.

In still another aspect of the present invention, a method of assembly for an interlock device comprises steps of providing a housing, and positioning a lead frame in the housing. The method further includes operably positioning a toggle interlock mechanism in the housing, the interlock mechanism including an electromechanical device having a pin extendable to a position outside of the housing. The method also includes positioning a preassembled switch in the housing, including electrically connecting the switch to the lead frame. The method also includes electrically connecting the electromechanical device to the lead frame so that the electromechanical device operates the switch when the extendable pin is retracted. The method further includes separating parts of the lead frame to form at least four separate conductors that operably interconnect the switch and the electromechanical device to a terminal adapted for electrical connection to a control circuit for operating the electromechanical device, and for signaling to the control circuit that the interlock member has been extended.

In yet another aspect of the present invention, a preassembled interlock device includes a housing having a plurality of protrusions, and a toggle interlock mechanism including an extendable pin positioned in the housing but extendable to a position outside of the housing. The interlock device also includes an electromechanical device attached to the housing, a preassembled switch in the housing including a plurality of first contacts, and a lead frame having at least four conductors including a plurality of second contacts. When the electromechanical device is energized, it retracts the pin and operates the switch. The first contacts are positioned and oriented to telescopingly engage the second contacts during assembly. The second contacts each include a mechanical retainer that retains the first contacts in operable engagement with the second contacts and further they are adapted to electrically operably interconnect the electrical mechanical device to a control circuit for operating the electrical mechanical device. The lead frame further includes a plurality of location holes with retaining tines that engage the housing protrusions to non-releasably and accurately locate the lead frame in the housing.

In still another aspect of the present invention, a shifter for a vehicle having an electrical control circuit includes a base component, a shift lever component operably positioned on the base component, and an interlock device on one of the base and shift lever components. The interlock device is configured and adapted to selectively engage an abutment surface on the other of the components for interlocking the shift lever in a selected gear position. The interlock device includes a preassembled switch and a lead frame, with the preassembled switch having at least three first contacts and the lead frame having at least three second contacts engaged with the first contacts. The first contacts are positioned and oriented to telescopingly engage the three second contacts during assembly, and at least one of the first and second contacts each include a mechanical retainer for securely retaining the first contacts in operable engagement with the second contacts after assembly.

These and other aspects, objects, and features of the present invention will be understood and appreciated by those skilled in the art upon studying the following specification, claims, and appended drawings.

BRIEF DESCRIPTION OF DRAWINGS SHOWING PRIOR ART

FIG. 1 is a side view of a prior art shifter utilizing an interlocking device; and FIG. 2 is an exploded perspective view of the prior art interlocking device of FIG. 1.

BRIEF DESCRIPTION OF DRAWINGS SHOWING PRESENT INVENTION

DESCRIPTION OF A PRIOR ART SHIFTER

Figure 1:
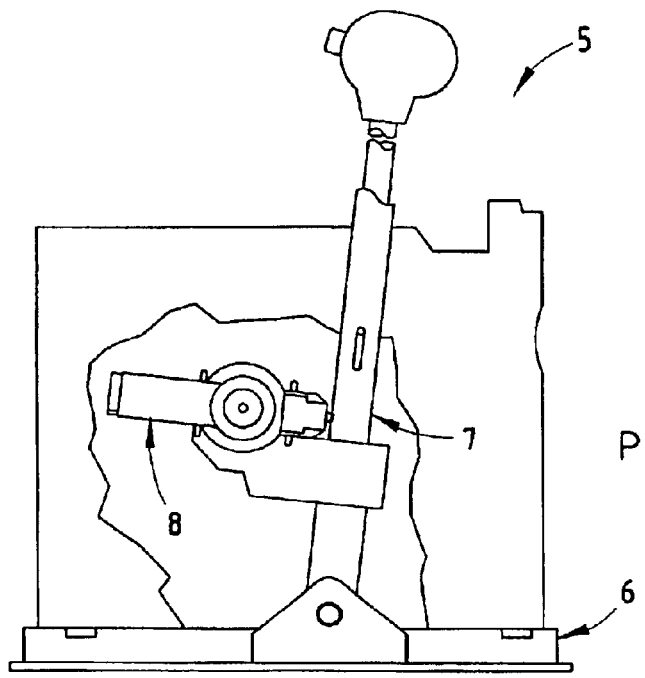
Figure 2:
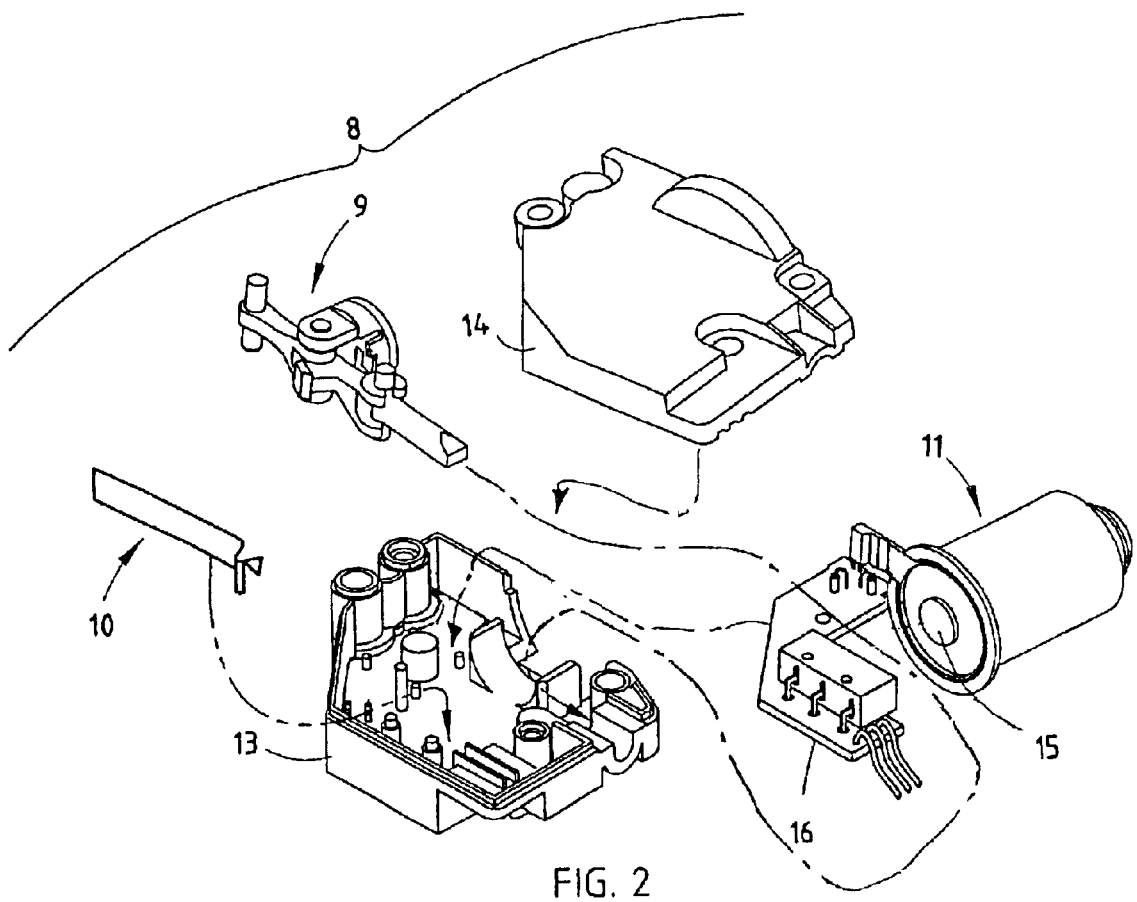

A prior art shifter 5 (FIG. 1) includes a base 6, a shift lever 7 pivoted to the base 6, and an interlock device 8 incorporating a toggle mechanism 9 (FIG. 2), a return spring 10, an electromechanical device 11, and a preassembled switch 12 all positioned in or attached to top and bottom housing components 13 and 14. The electromechanical device 11 includes an electrical coil and an extendable pin 15. A circuit board 16 includes conductors (not specifically shown) forming a branch circuit adapted for connection to a vehicle control circuit, and leads from the switch 12 and coil of the electromechanical device 11 are soldered to the conductors on the circuit board 16.

DETAILED DESCRIPTION OF THE PREFERRED EMBODIMENTS

Figure 3:
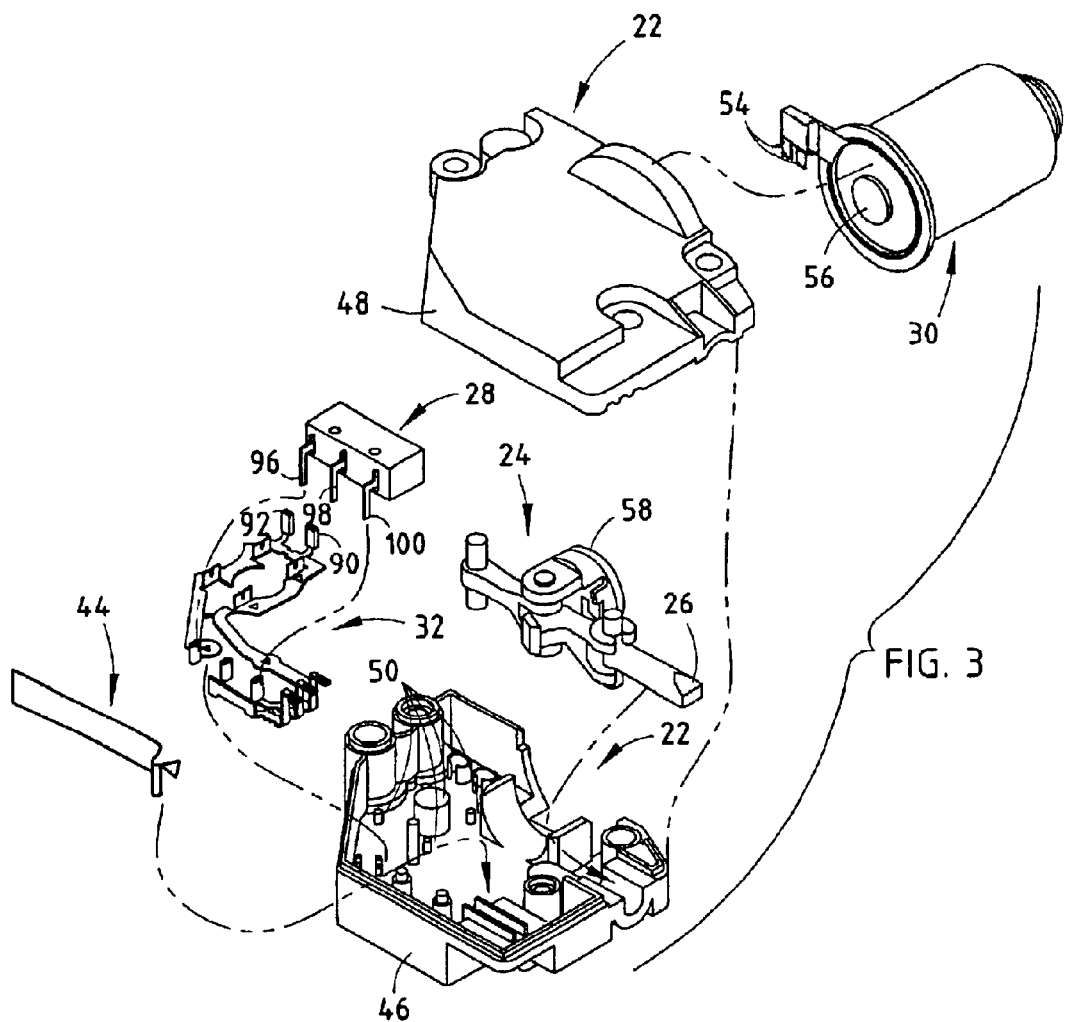
FIG. 3 is an exploded perspective view of the present inventive interlock device according to the present invention.
Figure 4:
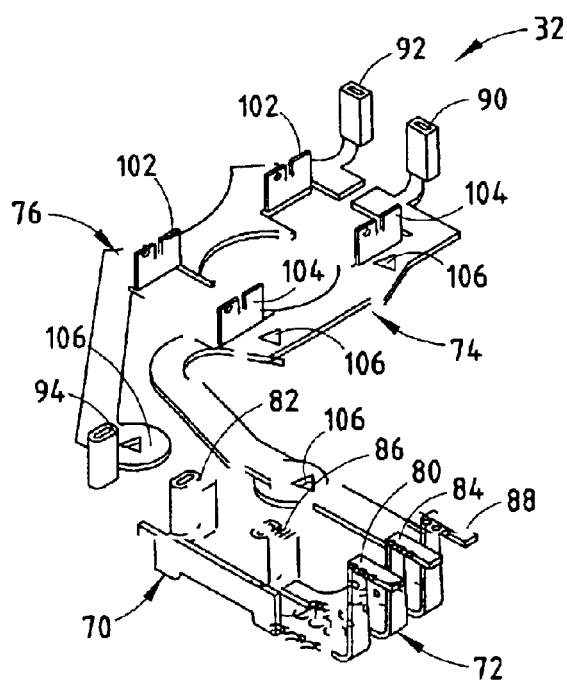
FIG. 4 is a perspective view of the lead frame shown in FIG. 3.

An interlock device 20 (FIG. 3) includes a housing 22 formed by opposing housing halves 46, 48, a toggle interlock mechanism 24 including an extendable pin 26, a preassembled micro switch 28, an electromechanical device 30, and a lead frame 32. The lead frame 32 has a plurality of conductors 72, 74, 76, and 78, all operably attached to the bottom half 46 of the housing 22 between the opposing halves 46, 48. When the extendable pin 26 is retracted (FIG. 9), the electromechanical device 30 operates the switch 28. The lead frame conductors 72, 74, 76, 78 form a terminal that operably interconnects the switch 28 and the electromechanical device 30 to a vehicle control circuit (not shown) for operating the electromechanical device and for signaling the vehicle control circuit that the extendable pin has been retracted. The present arrangement, including the lead frame, permits an efficient automated assembly, and further does this using mechanical forming and assembly operations that are controllable and relatively low-cost. Thus, the present inventive concepts provide the advantages of reducing manufacturing and assembly costs while increasing the overall reliability and robustness of the interlock device.

The housing bottom half 46 (FIG. 3) is a molded polymeric component that includes integral molded-in protrusions 50 adapted to matingly engage "rosebud" apertures 106 formed on the lead frame 32. A plurality of the protrusions 50 and apertures 106 are formed on the housing half 46 and in the conductors 70, 72, 74 and 76 of the lead frame 32, and also various features are formed in the housing to trap and retain the lead frame conductors 70, 72, 74, 76, so that each conductor is accurately located and retained in the housing 22. This allows the lead frame 32 to be assembled as a unit by pressing the conductors 70, 72, 74, 76 downwardly, such that tines on the "rosebud" apertures flex and bite into the protrusions 50. This results in a simple assembly that can be easily automated, such as by using a strip advance mechanism and downward pressing plunger. (See FIGS. 10–11.)

The electromechanical device 30 includes a coil (not specifically shown) and an extendable plunger 56. Conductors extend from the coil for energizing the coil to extend the plunger 56, the conductors terminate in two contacts 54 adapted to telescopingly mate with contacts 90, 92 on the lead frame, as discussed below. The plunger 56 is spring-loaded to be in a normally retracted position, and is operably interconnected to the driver 58 of the toggle interlock mechanism 24 by a magnet.

The toggle mechanism 24 includes a T-shaped arrangement of interconnected links. It is operably supported in the cavity of housing halves 46, 48 for movement between an overcenter interlock position (FIG. 8) and an unlocked retracted position (FIG. 9).

Figure 8:
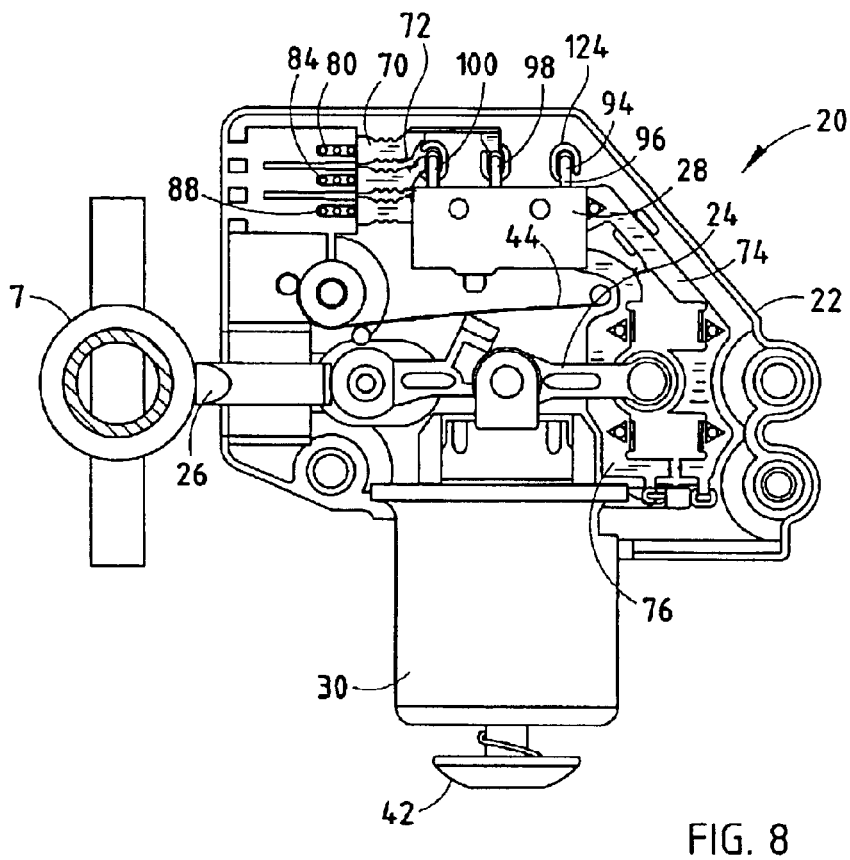
FIG. 8 is a plan view of the present interlock device of FIG. 3, with the top cover removed to better show internal components, the internal toggle mechanism being in an over-center interlocked position with the extendable pin extended.
Figure 9:
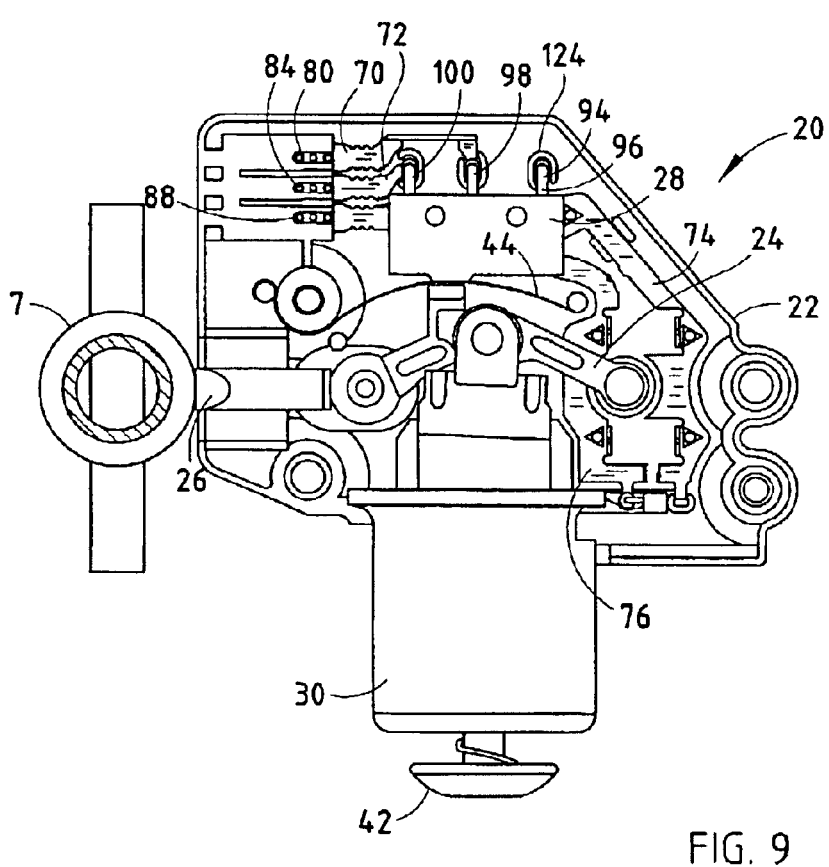
FIG. 9 is a plan view similar to FIG. 8, but with the toggle mechanism being in a retracted position with the extendable pin retracted.

As noted above, the lead frame 32 includes four conductors or branches 70, 72, 74, 76 (FIG. 8). The first conductor 70 includes a male contact 80 and a female contact 82 (also called connectors 82, 86). The second conductor 72 further includes a male contact 84 and a female contact 86. The third conductor 74 includes a male contact 88 and a female contact 90. Finally, the fourth conductor 76 includes female contact ends 92 and 94. The first, second, and third input male contact ends 80, 84, and 88 are arranged and form a terminal shaped to receive a female plug of a wire harness from the main vehicle power train electrical system. The female contacts 82, 86, and 94 are arranged to receive and electrically connect to the male connectors 96, 98, 100 extending from the switch 28. Further, the female contacts 90 and 92 are configured and arranged to engage the contacts 54 that communicate electrical power to the electromechanical device 30. Up tabs 102 and 104 are formed on the third and fourth conductors 74 and 76 respectively to engage opposite ends of diodes that extend between the third and fourth conductors 74 and 76. A plurality of apertures 106 with angled retainer tines are formed along the four conductors 70, 72, 74, 76 to retain the branches accurately in place on housing protrusions 50.

The female contacts 82, 86, 90, 92, 94 are formed to mechanically retain corresponding male connectors. This may be but is not limited to, for example, a spade type of connector or terminal.

Figure 5:
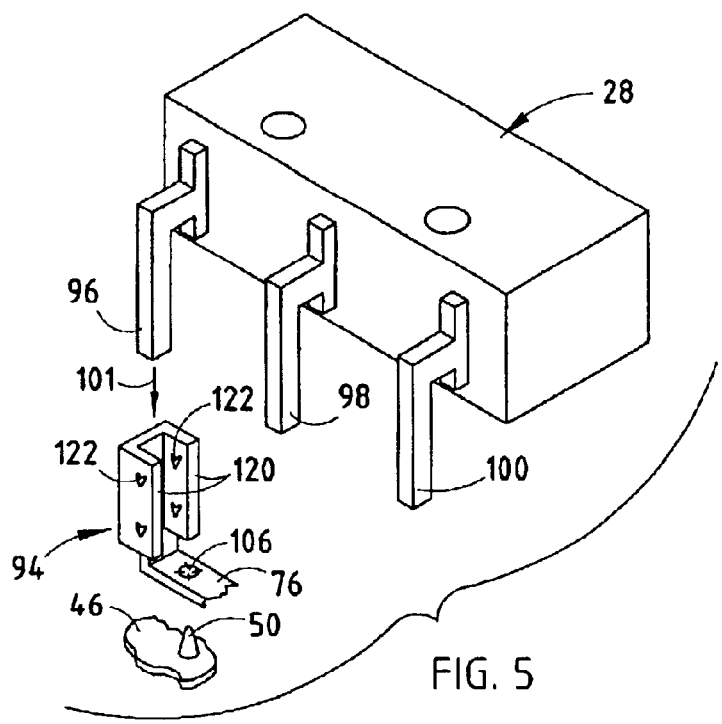
FIG. 5 is a fragmentary perspective view showing the micro switch of FIG. 3 and one female connector of the lead frame of FIG. 4 for non-releasably engaging a male connector on the micro switch.
Figure 6:
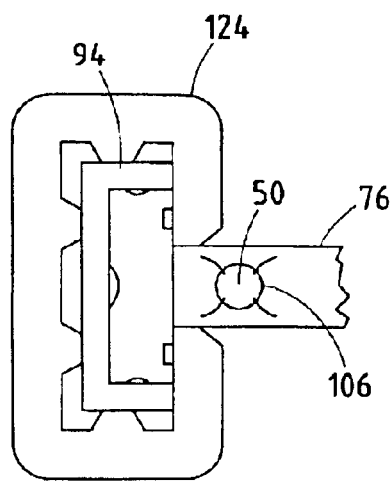
FIGS. 6 and 7 are top and perspective views of the female connector of the lead frame as shown in FIG. 5, with the female connector being supported in the housing of the interlock device of FIG. 3.
Figure 7:
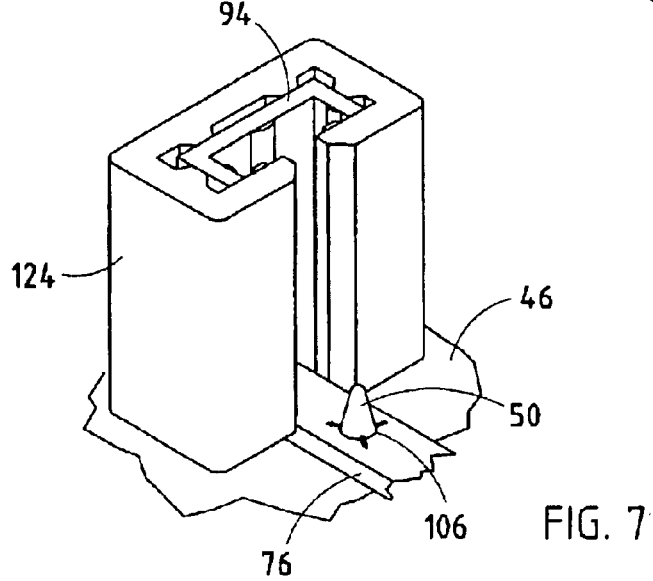

The female contacts 82, 86, 90, 92 and 94 are similar to each other, such that only the contact 94 need be shown and described. The contact 94 (FIGS. 5–7) has a C-shaped cross section, and includes opposing sidewalls 120 with inwardly-formed downwardly-angled barbs 122. The female contact 94, including the barbs 122, slidably engage and permit a telescoping engagement in a direction 101 by the male contact 96, such that the switch 28 can be pressed into position and simultaneously electrically connected. However, the barbs 122 have a relatively sharp pointed tip that digs in and prevents removal of the male contact 96 from the female contact 94 once assembled. The housing bottom half 46 includes a C-shaped wall 124 that receives and supports the C-shaped female contact 94, providing the support needed to prevent the C-shaped female contact from spreading apart. This maintains a pressure of the barbs 122 on the male contact 96. This both provides an initial secure assembly, but also reduces warranty problems from connections coming loose and separating when in service.

Figure 10:
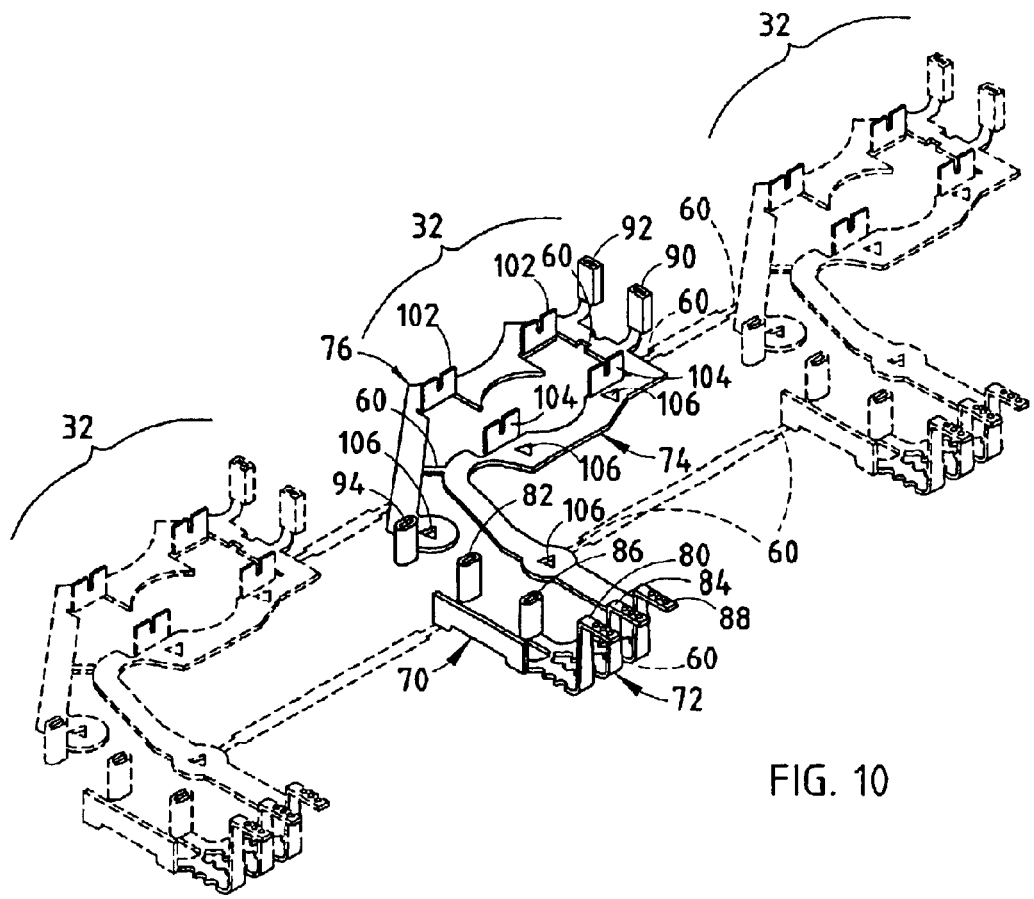
FIG. 10 is a perspective view of a continuous strip of lead frames.
Figure 11:
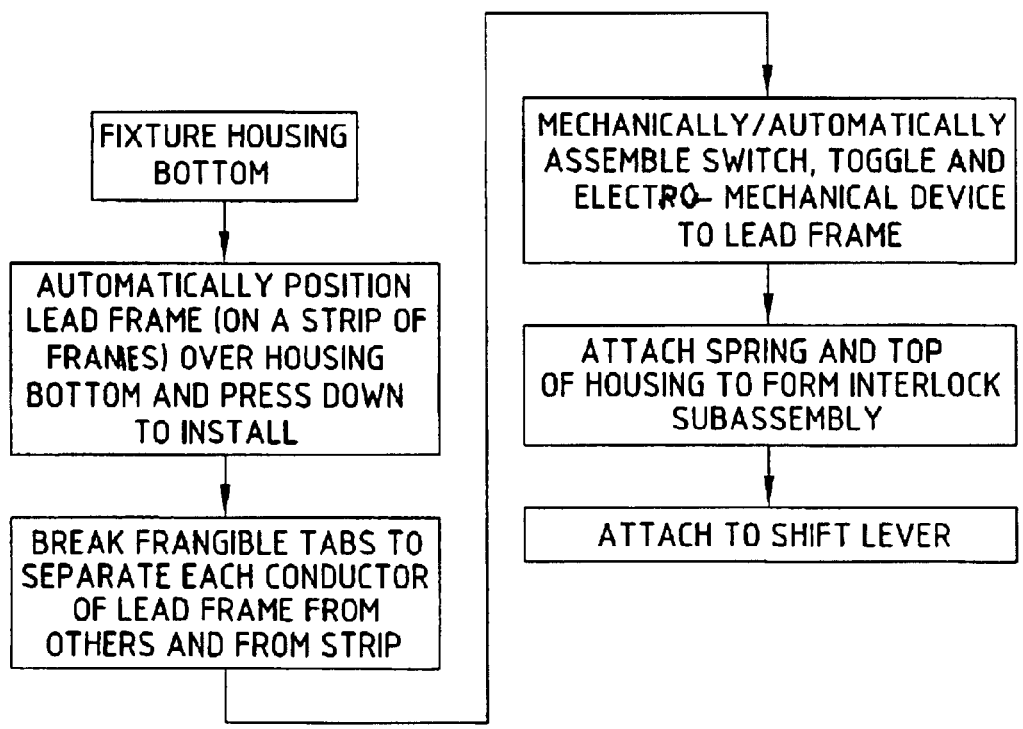
FIG. 11 is a flow diagram of a method of assembly for the interlock device of FIG. 3.

A method of assembly (FIG. 11) for the interlock device 20 may be as follows. A lead frame 32 is stamped into the desired configuration out of a single piece of electrically conductive material. This lead frame may be produced in continuous form as shown in FIG. 10. The lead frame 32 is then accurately positioned above the housing and then pressed mechanically down into housing 22 onto the housing protrusions 50. Lead frame barbed apertures 106 non-releasably engage and accurately position the lead frame 32 to the housing 22. The electromechanical device 30 is then positioned in housing 22, including telescopingly engaging the male contacts 54 into female contacts 90 and 92. Preassembled switch 28 with its associated switch contacts 96, 98, 100 is also pressed downward to telescopingly engage the male contacts 96, 98, 100 with the associated lead frame female contacts 82, 86, and 94. The four conductors 70, 72, 74, 76 are electrically separated by cutting the frangible tabs 60, producing an operable interconnection between the lead frame 32, electromechanical device 30, switch 28, and, when connected in a vehicle, to the vehicle control system (not shown). The toggle interlock mechanism 24 and retainer spring 44 are then positioned in housing 22. Finally, housing cover 48 is installed over the lower housing half 46 and securely affixed thereto, such as by snap-attachment, screws, adhesive, sonic welding, or other means.

Interlock device 20 is shown in its natural state (FIG. 8) with the extendable pin 26 engaging a pocket in the shift lever (7) to prevent the pawl of the shift lever (7) from being moved, such that the shift lever (7) cannot be moved out of its park position. In operation (FIG. 9), if the vehicle circuit shows that predetermined vehicle conditions are met, it actuates the coil of device 30, thereby electromechanically extending the plunger 56 of electromechanical device 30 outward, which causes the toggle mechanism 24 to be driven from an inline position (FIG. 8) to an off-centered position (FIG. 9). The toggle mechanism 24 as it is being driven off-center, acts to retract the extendable pin 26 from any abutment surface or cavity. The extendable pin 26 may be used to prevent relative movement of any parts. In the illustrated arrangement, it is used to lock a vehicle shifter in a park position on its base until the brake is depressed by preventing a pawl on the shifter from being moved out of a park position. Simultaneously when the pin 26 is retracted, the toggle mechanism depresses the switch 28. Thus, the switch 28 can be used to input data to the vehicle's electrical control circuit.

It is contemplated that the present interlock device 20 could be used in other automotive or non-automotive applications. For example, it is contemplated that device 20 could be used on hotel door locks, and other locking arrangements using an extendable pin. Also, it is contemplated that the pin (26) of the interlock device (20 can engage an irregular surface having multiple locking locations, such that the lever or component being controlled could be held in any one of several different operative positions until predetermined conditions of the control circuit are met and the pin (26) is retracted.

It is to be understood that variations and modifications can be made on the aforementioned structure without departing from the concept of the present invention, and further it is understood that such concepts are intended to be covered by the following claims unless these claims by their language expressly state otherwise.

The invention claimed is:

1. A shifter for a vehicle having an electrical control circuit, the shifter comprising:
   a base;
   a shift lever pivoted to the base;
   an interlock device on one of the base and the shift lever, and an abutment surface on the other of the base and the shift lever, the abutment surface being configured for selective engagement by the interlock device to control movement of the shift lever;
   the interlock device including a preassembled switch, an electromechanical device, and a lead frame, the lead frame having at least four conductors, the electromechanical device having an interlock member movable to an extended position engaging the abutment surface, and a retractable position where the interlock device operates the switch;
   the at least four conductors operably interconnecting the switch and the electromechanical device to each other and being adapted for electrical connection to the vehicle control circuit for operating the electromechanical device and for signaling to the vehicle control circuit via the switch that the interlock member has been extended.

2. The shifter defined in claim 1, wherein the lead frame includes a plurality of contacts that telescopingly receive and operably interconnect the switch and the electromechanical device, and that are adapted to connect to the vehicle control circuit; the contacts providing secure non-releasable mechanical retention.

3. The shifter defined in claim 1, wherein the preassembled switch includes a plurality of first contacts, and the lead frame includes a plurality of second contacts, the first contacts being positioned and oriented to telescopingly engage the second contacts during assembly, and one of the first and second contacts including a mechanical retainer for retaining the first contacts in operable non-releasable engagement with the second contacts after assembly.

4. The shifter defined in claim 1, wherein the interlock device includes a housing having a plurality of protrusions and the lead frame including a plurality of location holes formed therein for location on the protrusions.

5. The shifter defined in claim 4, wherein the plurality of location holes further include inwardly extending retaining tines adapted for non-releasable mechanical fastening to the protrusions.

6. The shifter defined in claim 1, wherein the at least four conductors are stamped from a sheet of electrically conductive material during a stamping process, the four conductors being initially interconnected with frangible tabs but the tabs being broken and the conductors being electrically separated within the housing after assembly.

7. An interlock device comprising:
a housing;
a toggle interlock mechanism including an extendable pin positioned in the housing, the pin being extendable to a use position outside of the housing;
a preassembled switch operably positioned in the housing;
an electromechanical device attached to the housing; and
a lead frame having a plurality of conductors, the electromechanical device being configured to operate the switch when the extendable pin is retracted;
the conductors operably interconnecting the switch and the electromechanical device and being adapted for electrical connection to a control circuit for operating the electromechanical device and for signaling to the control circuit that the extendable pin has been moved.

8. The interlock device defined in claim 7, wherein the lead frame includes a plurality of contacts shaped to operably interconnect the switch and the electromechanical device to the control circuit; the connectors being configured to non-releasably mechanically engage and retain mating contacts on the switch and electromechanical device.

9. The interlock device defined in claim 7, wherein the preassembled switch includes a plurality of first contacts, and the lead frame includes a plurality of second contacts, the first contacts being positioned and oriented to telescopingly engage the second contacts during assembly, and second contacts each including a mechanical retainer for non-releasably engaging and retaining the first contacts in operable engagement with the second contacts after assembly.

10. The interlock device defined in claim 7, wherein the interlock device includes a housing having a plurality of protrusions and the lead frame includes a plurality of location holes formed therein for location on the protrusions.

11. The interlock device defined in claim 10, wherein the plurality of location holes further include resilient retaining tines adapted for mechanical fastening to the protrusions.

12. The interlock device defined in claim 7, wherein the at least four conductors are formed from one piece of electrically conductive material during a stamping process, the four conductors being initially part of a single stamping but after assembly being severed apart and electrically separated.

13. A method of assembly for an interlock device comprising steps of:
providing a housing;
positioning a one-piece lead frame in the housing;
operably positioning a toggle interlock mechanism in the housing, the toggle interlock mechanism including an extendable pin that is extendable to a position outside of the housing;
positioning a preassembled switch in the housing, including electrically connecting the switch to the lead frame;
positioning an electromechanical device in the housing, including electrically connecting the electromechanical device to the lead frame, the electromechanical device, when the extendable pin is retracted, being arranged to operate the switch; and
separating parts of the lead frame to form at least four conductors, the four conductors operably interconnecting the switch and the electromechanical device and forming a terminal adapted for electrical connection to a control circuit for operating the electromechanical device and for signaling to the control circuit that the interlock member has been extended.

14. The method defined in claim 13, including a step of manufacturing in a continuous strip of lead frames from electrically conductive material.

15. The method defined in claim 14, wherein the step of manufacturing includes stamping a sheet of material.

16. A preassembled interlock device comprising:
a housing including a plurality of protrusions;
a toggle interlock mechanism positioned in the housing, the toggle interlock mechanism including an extendable pin that is extendable to a position outside of the housing;
an electromechanical device operably attached to the housing for moving the pin;
a preassembled switch positioned in the housing and including a plurality of first contacts;
a lead frame having at least four conductors and a plurality of second contacts, the electromechanical device operating the switch when the extendable pin is retracted;
the first contacts being positioned and oriented to telescopingly engage the second contacts during assembly;
one of the first and second contacts including a mechanical retainer for retaining the first contacts in operable engagement with the second contacts; and
the lead frame including a plurality of location holes formed therein for location on the protrusions, the location holes further including a plurality of retaining tines adapted for mechanical accurate fastening to the protrusions.

17. A shifter for a vehicle having an electrical control circuit, the shifter comprising:
a base component and a shift lever component operably positioned on the base component;
an interlock device on one of the components, the interlock device being configured and adapted to selectively engage an abutment surface on the other of the components for interlocking the shift lever in a selected gear position;
the interlock device including a preassembled switch and a lead frame, the preassembled switch having at least three first contacts, and the lead frame having at least three conductors with three second contacts;
the three first contacts being positioned and oriented to telescopingly engage the three second contacts during assembly, the three second contacts each including a mechanical retainer for retaining the first contacts in operable engagement with the second contacts after assembly.

18. The shifter defined in claim 17, wherein the mechanical retainer includes at least one barb.

* * * * *